Figure 1:
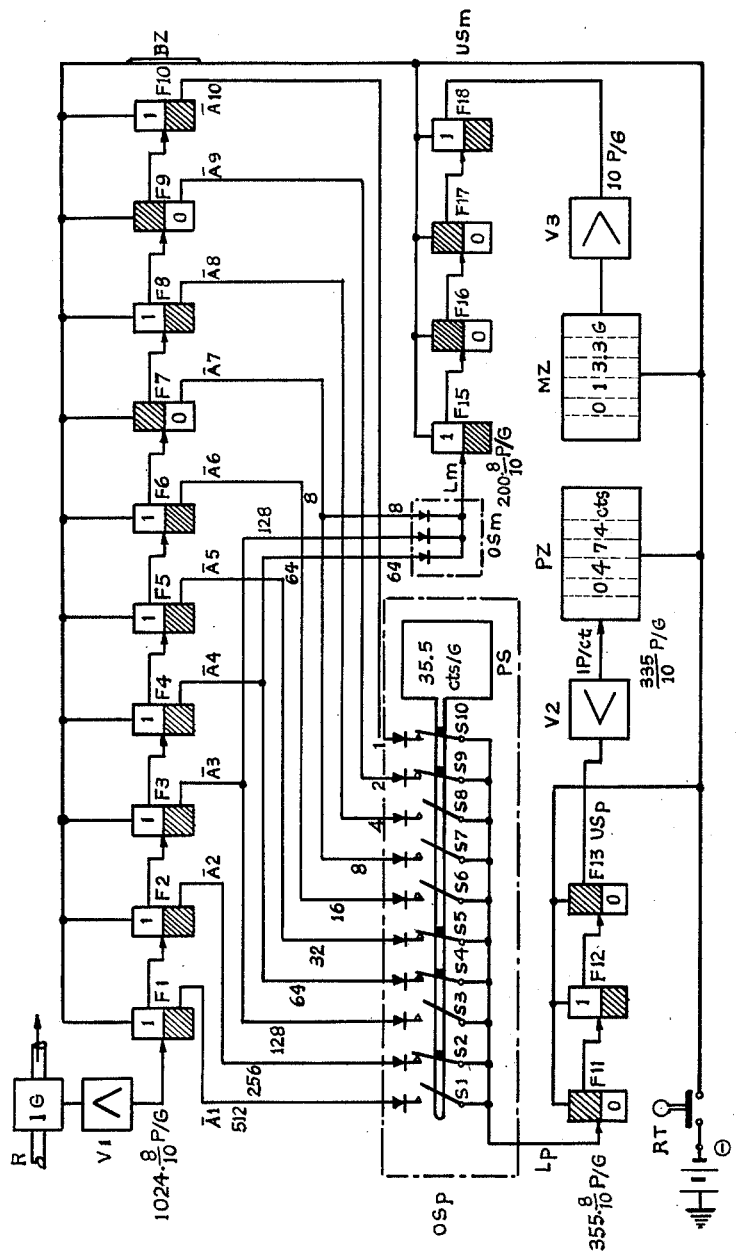

Nov. 24, 1964  P. J. I. TOTH  3,158,736
AUTOMATIC METERING DEVICE
Filed June 2, 1960  3 Sheets-Sheet 1

INVENTOR.
PETER J. I. TÒTH
BY Albert L. Jeffers
HIS ATTORNEY.

INVENTOR.
PETER J. I. TOTH
BY Albert L. Jeffers
HIS ATTORNEY.

3,158,736
AUTOMATIC METERING DEVICE
Peter J. I. Toth, Bombachstrasse 25,
Zurich 10/49, Switzerland
Filed June 2, 1960, Ser. No. 33,505
4 Claims. (Cl. 235—164)

The present invention relates in general to an automatic metering device, and more specifically to an automatic device for progressive integration of the value of the product from a quantity which increases unitarily with respect to time, and from at least one variable parameter, with the use of an impulse pickup so constructed that it produces an impulse for each predetermined elementary quantum of the volumetric increase; also a binary meter for impulses produced by the impulse pickup.

For example, in a filling station, the amount of gasoline can be indicated, and the total price, as the product of the volume and price per unit, the latter being variable. The known method of accomplishing this is to have the shaft of the metering mechanism of the volume indicator, which is actuated by the volumetric pickup, drive a price-metering device by means of a change-gear mechanism with variable gear-ratio. The setting of a variable gear mechanism for a large number of possible gear ratios corresponding to a large number of possible unit prices presupposes a great deal of technical knowledge; such change-gear mechanisms are complicated and have large structural elements. Since, in the previously known volume- and price-indicating devices of this kind the volume pickup has to do mechanical work in the actuation of the volume-metering apparatus and the price metering mechanism, it must be constructed of elements capable of heavy duty, and is subject to mechanical wear. However, many pickups are known which produce an impulse, preferably an electrical impulse, for each predetermined elementary quantum of the volumetric increase. For example, there could be incorporated in gasoline dispensing apparatus a turbine meter actuated in proportion to the speed of flow. There are many other kinds of applications, for example, in conveyors for goods, such as bar-shaped articles which can be counted in this manner by means of unit impulses. Pickups with electrical impulses as the metering elements have no mechanical work to do, and can therefore have small dimensions; such apparatus can therefore be comparatively inexpensive, as compared with the mechanical, and because of the absence of wear, its precision and length of life are good.

Likewise, it is known that a series of impulses can be imposed upon a binary counter consisting of a chain of "Yes"-"No" steps; each of two stable states can take the "Yes" or "No," or 1 or 0, as the case may be, and can be transformed over to the other state by means of an imposed impulse. In this case, these steps are arranged one behind the other in binary counters in such a way that when a step is transformed from the "Yes" to the "No" state, an effective impulse is transmitted to the next step in the sequence, while if a "No" is transformed into a "Yes" state, no effective impulse is transmitted to the next step in the sequence. Thus, in each case, the $n$th step of a binary meter receives only each ½ $n$th inlet impulse, if $n$ represents the number of preceding steps. The combination of the steps in the "Yes" state at a given time represents the total number of previously produced impulses in a binary counter system.

For an electrical or an electronic impulse series, so-called flip-flop members are used as the steps in a binary counter. By means of suitable one-way connections between the different steps of a binary counter, it is possible to achieve an impulse transmission in a certain ratio as follows: each $p$th impulse of an inlet impulse series appears at the provided outlet of the binary counter, and it can be counted there by means of an impulse counter. Thus, the price per unit of the product can be set as desired at all different values P between 100 and 999 units; the number of impulses produced by the volume-impulse pickup per volume units (gallons-) dispensed must correspond to the common multiple of this individual value, that is the quantity:

$$\frac{999}{100}$$

and the number of steps of the binary counter must be very large to correspond to this large number. Neither of these two requirements could be met at a reasonable cost. Moreover, it is not a simple matter to make the connections between the steps of the binary meter with variable values of $p$, nor is it easy to read off the impulse-transmission-ratio resulting from the combination of the connections made.

In this regard the present invention offers new and advantageous methods. It is characterized by the fact that the complementary outlet impulses of all steps of the binary counter are transmitted to each inlet of the impulse apparatus, which may be either blocked, if desired, or open in the outlet direction only, so that the combination of open impulse inlets is definitely proportional to the equivalent binary value of the parameter at the moment, and the complementary impulses allowed by the impulse apparatus to pass through, are transmitted over a common impulse collector, to the inlet of a product-value meter.

While in a binary meter, the number of steps which are transformed from the "Yes" to the "No" state might be very large in the case of a complementary outlet impulse, only one step of a binary counter can be transformed simultaneously from the "No" to the "Yes" state. It is only necessary to transmit the complementary impulse of a binary meter step in the state "Yes" by reversing the binary meter step, to the impulse inlet apparatus, while the impulse produced by switching to the "No" state is transmitted in the known manner to the next binary meter step. The individual steps of the binary-meter chain have been transformed from the "No" state to the "Yes" state according to the rule shown in the table below:

| Steps | | | Portion of "Yes" states compared with total number of counted impulses |
|---|---|---|---|
| $\frac{n}{1}$ | 1— 3— 5— 7 | $--(-1+2q)$ | $½+1$ |
| 2 | 2— 6—10—14 | $--(-2+4q)$ | $¼+1$ |
| 3 | 4—12—20—28 | $--(-4+8q)$ | $⅛+1$ |
| 4 | 8—24—40—56 | $--(-8+16q)$ | $1/16+1$ |
| $n$ | $2^{n-1}$ | $(-2^{n-1}+2^n.q)$ | $½^n\ 1$ per $+1$ |

With this knowledge, it is possible, with the aid of an impulse apparatus, to set up in a simple manner any kind of impulse reduction ratio by the proper combination of the through-flow impulse openings.

The apparatus of this invention can advantageously be constructed as an electronic intsrument, since it includes an impulse pickup for electrical impulses, a binary meter designed as a chain of electronic flip-flop steps, and a current-impulse arrangement which can be installed with the aid of switches on a predetermined outlet combination for collecting the transmitted complementary impulses on a common impulse-collector line. For example, a certain combination of open inlets can be determined by interchangeable code-patterns PS which the corresponding switches will either open or close, whereby the effective code pattern can carry a visible figure representing the proper parameter amount, for example, the corresponding unit price.

If desired, provision can just as well be made so that the combination in question of open impulse inlets can be determined by the installation of control members across a pickup apparatus, adjustable forwards or backwards according to the size of the parameter; the control members would be affected by the impulse inlet, and could be cams or strips having perforations, so that each value of the parameter would correspond to a certain position of the control strip and therefore to a corresponding combination of open impulse inlets. The product-value meter would then show the following integral:

$$\int_0^Q a\,dq$$

wherein $a$ could be a continuously varying parameter value.

An apparatus of this kind could be employed, for example, to measure the heat consumption of a building connected to a remote heating plant. By means of a flow meter built as an impulse pickup, the hot water flowing through the pipes heating a building could be measured, and the impulse apparatus controlled by a digital thermometer to measure the temperature difference between the inlet water and the return-flow water, so that the product-value meter could be read to show the number of calories consumed. A similar application is the measurement and indication of the total amount of coal delivered from a coal mine, in which case the movement of a conveyor belt can be measured by means of an impulse pickup, and the corresponding weight or load per unit of the length of the conveyor belt, due to the coal lying thereon can be regarded as the parameter.

Similar problems arise in the weighing of flowing gases in relation to temperature and pressure, by means of a flow meter.

A very important example is the metering of material being dispensed, for example, gasoline, and the indication of the total price for the amount dispensed, when the price per unit must be set as desired. Here it is advantageous to provide that the complementary outlet impulses of certain steps of the binary meter on which are imposed the impulses produced by the impulse pickup in relation to the amount of material dispensed, are transmitted over a first, permanently fixed impulse-inlet apparatus (OS$m$) to a volumetric meter (MZ), and over a second impulse-inlet apparatus (OS$p$) selectively adjustable in relation to the unit price, thence to a total price meter (PZ).

Provision can also be made so that the impulse-collector line of the impulse-inlet apparatus (OS$p$) which is adjustable to a selected combination of conductive impulse-inlets in relation to a first parameter-amount, can be transmitted to a second binary meter, whose steps, in the same manner as the first binary meter, are connected to the inlets of a second impulse apparatus which is adjustable to a selected combination of conductive impulse-inlets in relation to a second parameter amount, whereby the impulses transmitted by the second impulse-inlet apparatus are integrated in a meter which indicates the triple product of the measured volumetric amount from the impulse-pickup and the two parameter-quantities.

In this manner, for example, in a saw-mill, the output of sawed wood can be measured and indicated by having the cut boards pass through feelers for thickness and width. The speed of travel of the boards, or the total length L can be measured by means of an impulse pickup and the two impulse-inlet members would be controlled by the thickness D and the width B of the boards, so that the output would be shown on the product-value meter as follows:

$$\int_0^L D\cdot B\cdot dl$$

The apparatus of the invention can also be used to advantage and at very little additional cost for automatic production of mixtures of chemical-technical components, where each charge composed of a predetermined volumetric amount can be added at a certain price per unit or at a certian weight per unit, and the supply is automatically checked when the required amount has been reached until finally the total weight and/or the total price of the charge is indicated.

This type of product integrator is also suitable for use in digital computing devices.

Figure 2:
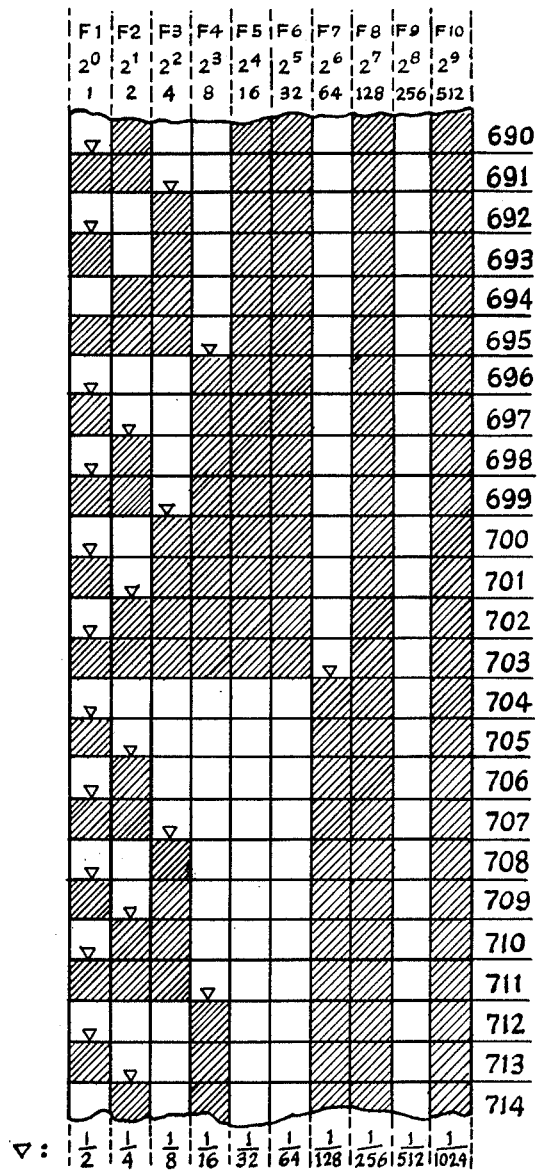
Figure 4:
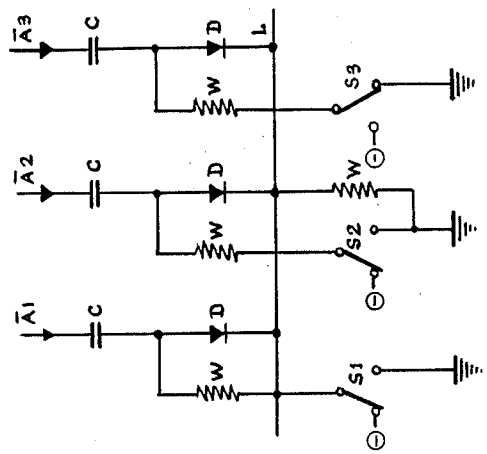
Figure 3:
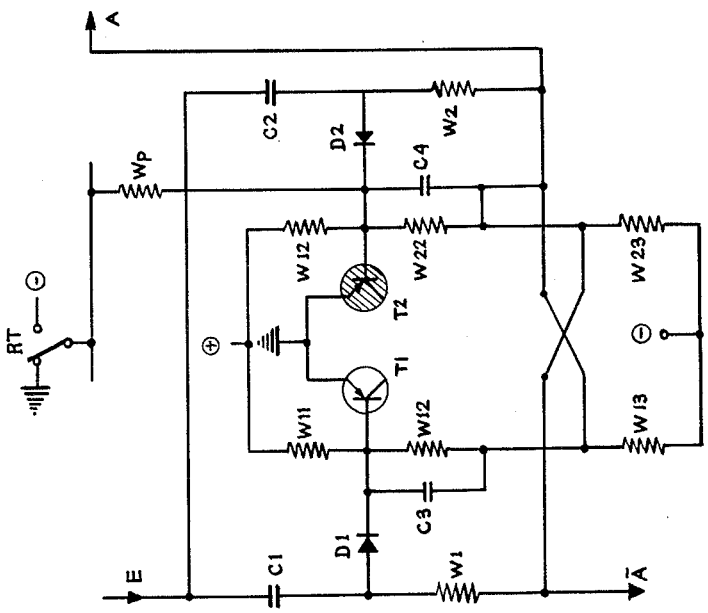

The drawing shows an application of the apparatus of the invention to a gasoline dispenser having a price indicator. In the drawing:

FIG. 1 is an overall diagram;
FIG. 2 is a code scheme for the binary meter of FIG. 1;
FIG. 3 is an example of the wiring diagram for a flip-flop step of the binary meter of FIG. 1;
FIG. 4 is a wiring diagram of the impulse inlet of FIG. 1.

In FIG. 1, R represents the pipe line through which gasoline, for example, is transmitted from the storage tank to the tank of an automobile. In the pipe line, an impulse pickup IG is interposed to serve as the measuring apparatus for the flow medium; this impulse pickup is designed so as to produce an electrical impulse for each unit quantum of the flowing fluid. For example, a pickup could be used which includes a turbine rotor freely rotatable in the cross section of the flow, and having magnetic poles cooperating with coils located outside the housing, in which coils a number of pulsations occur per revolution of the rotor, the pulsations being transmitted to an amplifier VI.

In the present case, for example, the impulse pickup produces, per gallon g. of the gasoline flowing through the conduit R: 1024·8/10=819.2 impulses. The line from amplifier VI on which the impulses appear one after the other as they are produced by the impulse pickup, extends to the inlet of electronic binary meter or counter BZ consisting of a chain of ten electronic flip-flop steps F1 to F10 inclusive. This type of flip-flop step F which is well known, is illustrated diagrammatically in FIG. 3 of the drawing. It is shown as a symmetrical wiring diagram and includes two transistors T1, T2; two diodes D1, D2; and condensers C1, C2, C3, C4; and resistors W1, W2, W11, W12, W13, W22, W23.

This type of flip-flop step has the ability to be changed over by each $(2p-1)$st positive impulse through the line E, from the "No" state in which the transistor T2 is conductive and transistor T1 is blocked, to the "Yes" state in which the transistor T2 is blocked and the transistor T1 is conductive. In changing over from the "Yes" state to the "No" state, there occurs on outlet line A a positive voltage impulse, which, according to FIG. 1, is transmitted to the inlet of the next flip-flop step. When this flip-flop step is connected to the negative pole (−) of the feed-voltage source through the resistance $W_p$ with the aid of the return key RT, it is then brought to the "No" state shown in FIG. 3 with the conductive transistor T2.

The "Yes" state of a flip-flop step is designated by 1 in FIG. 1, and the "No" state by 0, above and below respectively, and for the purpose of clarification, the state not indicated is cross-hatched. The combination of the flip-flop steps in the binary meter which are in the "Yes" state denotes the number of effective impulses, as may be seen from FIG. 2. The powers of 2 at the top of the columns correspond to the flip-flop steps and represent bits in a binary number, while the decimals on the lines belong to the different combinations.

Thus, it may be seen that in going over from $$703 = 2^0+2^1+2^2+2^3+2^4+2^5+2^7+2^9$$
$$= 1+2+4+8+16+32+128+512$$
$$\text{to } 704 \quad +2^6+2^7+2^9=64+128+512$$

the first six flip-flop steps of the binary chain change over through an inlet impulse from the "Yes" to the "No" state. It is clearly seen, however, that in each transition from one number to the next, *only one* flip-flop step goes over from the "No" to the "Yes" state. These transitions are designated $\nabla$. Of a total number of periods of $1024=2^{10}$ inlet impulses, $512=\frac{1}{2}$ the impulses appear as complementary impulses on the first step, $256=\frac{1}{4}$ on the second step of the counter or binary meter, as indicated below. The complementary impulses in going over from the "No" to the "Yes" state by a flip-flop step are taken up by the outlet lines $\overline{A}$ of the flip-flop steps and, according to FIG. 1, are transmitted, each to an impulse inlet of the "Or" inlet OS shown only in semi-diagram in FIG. 1.

A portion of this type of impulse-inlet arrangement OS is shown in detail in FIG. 4. So long as the movable switch contacts S are on the negative potential pole $\ominus$ (contacts S1, S2), the corresponding inlet capacities C are charged so heavily with a negative charge that a positive impulse thrust cannot take place through the diode D to the common impulse-collector line L. If, however, a contact, for instance S3, is applied to the 0-potential, a positive inlet-impulse is transmitted to the collector line. A reaction of the impulses transmitted to the collector-line L sent through by the corresponding impulse inlet on the inlet lines $\overline{A}$ of the other impulse inlets is prevented because of the single direction of transmission of the diodes D. The necessary resistors are designated as W.

In FIG. 1 is illustrated an "Or" inlet circuit OSp through a series of contacts S1 to S10 inclusive with connected diodes symbolically represented, and on the corresponding inlet lines (complementary outlet $\overline{A}$ of the binary meter steps) are written the complementary impulse numbers, which appear on the corresponding line per 1024th period.

The combination of the open impulse inlets (switches S2, S4, S5, S9, S10) are represented in FIG. 1 by a comb-like pattern PS, which projects into the "Or" inlet circuit OSp, and is plainly marked with the proper unit price value 35.5 cts./g. (in this case, cents per gallon)=355/10 cts.=256+64+32+2+1. On the impulse-collector line Lp of the "Or" inlet circuit, OSp, there appear therefore, per 1024 inlet impulses to the counter or binary meter BZ, 355 complementary impulses, which are transmitted over this line Lp to a reducer USP with three flip-flop steps F11, F12, F13, which transmits only each $2^3\text{rd}=8$th of its inlet impulses through the amplifier V2 to the price meter PZ. Therefore, there appear on this price meter the following figures for the per gallon dispensed:

$$1024 \cdot \frac{8}{10} \cdot \frac{355}{1024} \cdot \frac{1}{8}=355/10 \text{ pulsations}$$

which is the product-value corresponding to the amount of gasoline dispensed at the unit price set.

By adjusting the price pattern PS to another the corresponding factor can be varied. If another unit price, for instance 407/10 cts./g. is required, the contacts S2, S3, S7, S8, S10 are closed, since:

$$407=256+128+8+4+1$$

In the above case, by the proper selection of closed switches S, all unit price values of 1/10 cts./g. to 1023/10 cts./g. can be set. It is easy to see that in place of interchangeable price readings PS, there could be employed control strips adjustable forwards or backwards acting on the switch of the impulse inlet apparatus OSp in binary equivalent combinations, for example, perforated strips or a rotatable cam ring for setting the desired unit price, which could also be automatically related to another kind of parameter value. This problem can be solved by means of an electronic system.

It would also be possible, instead of the reduction apparatus USp, to install a complete binary counter or meter BZ (as shown in FIG. 1) at the impulse-collector line, the complementary outlets of which would lead to a second inlet circuit, so that at its outlet, the triple-product value of the volumetric-impulse amount would be indicated with a first and a second parameter value.

The complementary outlets $\overline{A2}$, $\overline{A3}$, and $\overline{A6}$ of the binary counter or meter BZ, shown in FIG. 1, are transmitted through the conductive impulse inlets of a one-way "Or" circuits OSm to a collcetor line Lm, on which, of 1024 impulses.

$$200=128+64+8 \text{ complementary impulses}$$

thence to a quantity reduction device USm with the flip-flop steps F15 to F18, which allows only every 16th of the impulses imposed on it to pass through the amplifier to the meter mechanism or indicator MZ.

By closing the key RT, all flip-flop steps of the binary meter BZ and the reducer USp and USm, as well as the price meter or indicator PZ and the volumetric meter or indicator MZ are placed in the "No" state, or set back to the zero position.

In the above case it is assumed that in a gasoline dispenser, $(10 \cdot 1024)+703=10943$ impulses are produced by the impulse pickup. That would be, in terms of volumetric units:

$$\frac{10943}{1024} \cdot \frac{10}{8}=\frac{10943}{819.2}=13.35 \text{ gallons}$$

At the assumed unit price of 35.5 cts. per gallon, the total price would be $35.5 \cdot 13.35=474.17$ cts. In the binary counter or meter BZ, the "Yes" combination is set to correspond with the number 703, according to FIGS. 1 and 2. Since, according to the binary equivalent combinations of conductive current inlets, of each 1024 inlet impulses determined by the price figures PS, 355 pass through the impulse inlet circuit OSp, and are transmitted to its collector line Lp, $3550+x$ impulses are transmitted to this collector, in which $x$ represents the sum $$x=x2+x4+x5+x9+x10$$

corresponding to those already allowed to pass through from the individual conductive impulse inlets from the residual amount (703 pulsations).

These residual amounts may be computed as follows:

$x2=703: \quad 4=175+1=176$
$\phantom{x2=703:}\ 30$
$\phantom{x2=703:}\ 23$
$\phantom{x2=703:}\ \ 3$
---

$x4=703: \quad 16=\ 43+1=\ 44$
$\phantom{x4=703:}\ 74$
$\phantom{x4=703:}\ 15$
---

$x5=703: \quad 32=\ 21+1=\ 22$
$\phantom{x5=703:}\ 63$
$\phantom{x5=703:}\ 31$
---

$x9=703: \quad 512=\ \ 1+0=\ \ 1$
$\phantom{x9=703:}\ 191$
---

$x10=703:1024=\ \ 0+1=\ \ 1$
---

$x \phantom{=703:1024=0+1} =244 \text{ residual pulsations}$

Total of the pulsations on line Lp=3794.

Since, of these, only each 8th pulsation is transmitted from USp to PZ, this shows:

3794 : 8 = 474 cts.
59
34
2 and there are remaining in the reducer, 2 residual pulses as indicated by the "Yes" combination in this reduction member.

In the impulse inlet apparatus OSm, on the collector line LM are:

$10 \times 200 + y3 + y4 + y7$ complementary impulses of the binary counter or meter BZ, so that:

$y3 = 703 : 8 = 87 + 1 = 88$
63
7

$y4 = 703 : 16 = 43 + 1 = 44$
63
15

$y7 = 703 : 128 = 5 + 0 = 5$
63

Total impulses on line $Lm = 137 + 2000 = 2137$

The number of impulses on line Lm is therefore 2137, of which each 16th is transmitted by the reducing member USm to the volumetric meter MZ: The volumetric meter MZ indicates therefore:

2137 : 16 = 133 units
53          +
57
9

Since 10 impulses correspond to one gallon, the volumetric meter MZ indicates 13.3 gallons, and there remain 9 residual impulses in USm, as shown in FIG. 1 of the drawings which shows the "Yes" combination.

The possible error in an apparatus illustrated in FIG. 1 has a limiting maximum value, which remains less the greater the number of flip-flop steps in binary meter BZ and the number of its inlet impulses chosen per unit indicated.

By setting back the flip steps of the reducing member USp and USm to a different value than on 0, for example, 4 or 8, a rounding off can be effected of the indicated values by halving the subsequent figures, while according to the example given, only rounded-off values are indicated.

In gasoline dispensing stations where several different kinds of gasoline ars sold, a volumetric pickup and an impulse apparatus OSp must be provided for each kind, but only one amplifier VI, binary counter or meter BZ, impulse apparatus OSm, reduction members USp and USm, amplifiers V2 and V3 and counting mechanisms PZ and MZ need be provided and many different structural elements would be set into operation by means of a simple electrical switch.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. Apparatus for counting the total unit volume of fluid passing through a conduit or the like and the total price of that volume based upon a price per unit volume comprising, in combination, (a) impulse generating means for producing an impulse for each predetermined volumetric quantity passing through said conduit or the like, (b) binary counting means coupled to said impulse generating means and having a plurality of bistable elements connected in cascade, (c) each bistable element having an output line on which impulses appear equal in number to one half the number of impulses applied to it by the preceding bistable element in the cabin of cascade-connected bistable elements, said impulses on the respective output lines of said bistable elements representing at any instant bits in a binary number, (d) a first impulse collector line, (e) switch means for connecting selected ones of said output lines to said first impulse collector line to thereby convert impulses on said output lines represensative at any instant of bits in a binary number to impulses on said collector line which are cumulatively representative of a digital number, (f) means for counting impulses on said first impulse collector line and for visually indicating the total price of fluid delivered through the conduit as a function of the number of impulses counted, (g) a second impulse collector line connected to a plurality of said output lines from the bistable elements, and (h) means for counting impulses on said second impulse collector line and for visually indicating the total volume of fluid delivered through the conduit as a function of the number of impulses counted by said last-mentioned counting means.

2. The computing apparatus of claim 1 wherein the means for counting impulses on said first impulse collector line and the means for counting impulses on said second impulse collector line each include binary counter means comprising a chain of electronic flip-flop steps.

3. The computing apparatus of claim 1 wherein the impulses produced by said impulse generating means are equal to eight-tenths the maximum number of impulses which can be counted by said binary counting means, and wherein the means for counting impulses on said first impulse collector line includes a chain of three bistable elements connected in cascade and adapted to divide the number of pulses on said first impulse collector line by eight.

4. The computing apparatus of claim 1 wherein the impulses produced by said impulse generating means for each predetermined volumetric quantity are equal to eight-tenths the total number of impulses which can be counted by the binary counting means, wherein said output lines connected to the second impulse collector line will comulatively apply to said second impulse collector line two hundred pulses each time the binary counting means has applied thereto the maximum number of pulses which it can count, and wherein the means for counting impulses on said second impulse collector line includes four bistable elements connected in cascade for dividing impulses on the second collector line by sixteen.

References Cited in the file of this patent
UNITED STATES PATENTS

| | | |
|---|---|---|
| 2,537,603 | Prangley | Jan. 9, 1951 |
| 2,913,179 | Gordon | Nov. 17, 1959 |
| 3,081,031 | Livesay | Mar. 12, 1963 |